(12) United States Patent
Kumar et al.

(10) Patent No.: US 8,510,813 B2
(45) Date of Patent: Aug. 13, 2013

(54) MANAGEMENT OF NETWORK LOGIN IDENTITIES

(75) Inventors: Sushant Kumar, Sunnyvale, CA (US); Eric Chin Lin, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 1406 days.

(21) Appl. No.: 11/611,327

(22) Filed: Dec. 15, 2006

(65) Prior Publication Data

US 2008/0148377 A1     Jun. 19, 2008

(51) Int. Cl.
*G06F 21/00*     (2006.01)

(52) U.S. Cl.
USPC .......................................................... 726/7

(58) Field of Classification Search
USPC .................. 726/1, 4, 8, 9, 10; 709/223–226
See application file for complete search history.

(56) References Cited

U.S. PATENT DOCUMENTS

| | | | |
|---|---|---|---|
| 7,478,434 B1 * | 1/2009 | Hinton et al. | 726/27 |
| 2004/0181598 A1 * | 9/2004 | Paya et al. | 709/227 |
| 2007/0044144 A1 * | 2/2007 | Knouse et al. | 726/8 |

* cited by examiner

*Primary Examiner* — Brandon Hoffman
*Assistant Examiner* — Anthony Brown
(74) *Attorney, Agent, or Firm* — Martine Penilla Group, LLP

(57) ABSTRACT

Apparatuses, methods, and systems directed to facilitate the management and/or security of network login and authentication systems. Some embodiments of the invention allow users to maintain a plurality of user accounts with a given domain, and switch among multiple login sessions. In other particular embodiments, the systems disclosed below can be used to identify and prevent phishing attacks. In some embodiments, the present invention involves using a personal identification number or string as an additional security measure. In some other embodiments, the present invention involves using an application identifier while establishing a login session with the network server.

20 Claims, 6 Drawing Sheets

MANAGEMENT OF NETWORK LOGIN IDENTITIES

TECHNICAL FIELD

The present disclosure relates to login and authentication systems in computer networks.

BACKGROUND

The most widely used part of the Internet is the World Wide Web, often abbreviated "WWW" or simply referred to as just "the Web". The Web is an Internet service that organizes information through the use of hypermedia. The HyperText Markup Language ("HTML") is typically used to specify the content and format of a hypermedia document (e.g., a Web page).

Each Web page can contain embedded references, referred to as "links", to images, audio, video or other Web pages. The most common type of link used to identify and locate resources on the Internet is the Uniform Resource Locator, or URL. In the context of the Web, a user, using a Web browser, browses for information by selecting links that are embedded in each Web page.

When accessing certain Web sites, it may be necessary for a user to enter a user identifier and password before being permitted to access data via that Web site specific to that user. For example, most financial institutions, investment companies, and other service-providing entities, including, but not limited to on-line shopping Web sites, permit a user (or client of the entity) to access his or her account(s) via the Internet. For obvious reasons, each access is predicated on the user entering certain user-specific information prior to obtaining access the user's account. For example, to set up an on-line account, a user may be required to provide certain user-specific information such as, for example, a user identifier and password. Once that user-specific information is provided and an on-line account is established, the user may only access his or her on-line account by providing the user-specific information as part of a login process. Still further, after the user has initially authenticated, cookies or tokens appended to messages transmitted by the user may be used by the remote server to allow the user to gain access to subsequent information.

Additionally, it is not uncommon for users to share a computer, especially in households. For example, each member of the household might have an on-line Yahoo! account and might use the same computer to access each individual account. On the other hand, a user might maintain a plurality of on-line accounts either at the same web site or different web sites. For example, a user might have multiple on-line Yahoo! Accounts. While it is conceivable that a user may use the same login identifier and passwords for each of the plurality of Web sites, such a practice is not recommended. In fact, a more desirable and recommended practice is to use different login identifiers and password for each on-line account. That will increase security of the user's on-line accounts and reduce the possibility of unauthorized access to those accounts if someone happens to obtain one of the user's login identifiers and passwords. However, using different login identifiers and passwords for each on-line account present its own problems; not the least of which is remembering each login identifier and password.

A major type of internet fraud today is known as phishing. Phishing typically involves the practice of obtaining confidential information such as usernames and passwords through the manipulation of legitimate users. Typically, the confidential information is a user's password, credit card details, social security number, or other sensitive user information. Phishing may be carried out by masquerading as a trustworthy person, Web site, or business. In one approach, a message, such as an email or instant message, may be sent to an unsuspecting user. The message may include a link or other mechanism that links to an illegitimate source. In another approach, a webpage that may appear to be legitimate is provided to the user. However, the webpage is designed to trick the user into providing their confidential information. Such Web pages may relate to account login sites, credit card entry sites, or the like.

The false site typically contains a request for the individual's password, credit card, social security number, or other personal information. This information, if given by the individual, is then submitted to the person posing as the bank or popular Web site. Once the unsuspecting user enters their information, the phisher may be able to obtain the sensitive information and use it to create fake accounts in a victim's name, ruin the victim's credit, make purchases under the victim's name, sell the information to others, perform acts under the victim's identity, or even prevent the victim from accessing their own money and/or accounts.

SUMMARY

The present invention provides apparatuses, methods, and systems directed to facilitating the management and/or security of network login and authentication systems. Some embodiments of the invention allow users to maintain a plurality of user accounts with a given domain, and switch among multiple login sessions. In other particular embodiments, the systems disclosed below can be used to identify and prevent phishing attacks. In some embodiments, the present invention involves using a personal identification number or string as an additional security measure. In some other embodiments, the present invention involves using an application identifier while establishing a login session with the network server.

In one embodiment of the present invention, the apparatuses and methods are directed to accessing a local token data store implemented on a client system to retrieve one or more identifiers. The accessing step comprises making one ore more application programming interface calls to a domain-restrictive data storage application that maintains a local token data store of token information, obtains an indication of a current domain context, and restricts access to the token information on a server domain basis.

In other embodiments of the present invention, the apparatuses, methods, and systems involve using a personal identification number or string as an additional authentication step before allowing access to authentication-related information in the local token data store. The personal identification number or string, in one embodiment, is stored on the client system and not sent to the network server.

The following detailed description together with the accompanying drawings will provide a better understanding of the nature and advantages of various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
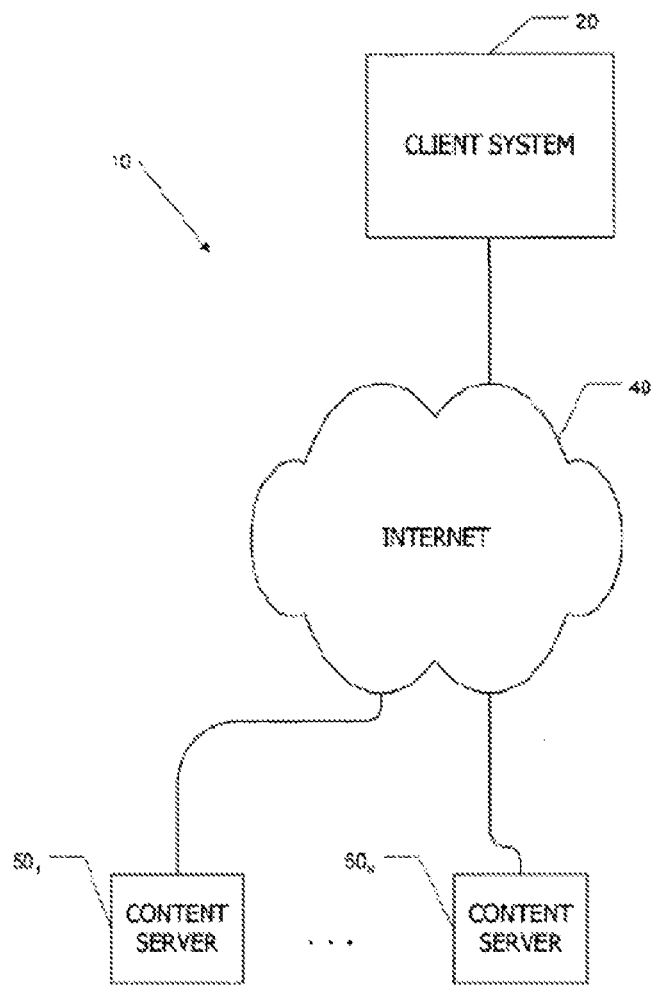
FIG. 1 is a diagram showing an example communication network, which network might be used with an embodiment of the present invention.

FIG. 1 illustrates a general overview of an information retrieval and communication network 10 including a client system 20 according to one particular embodiment of the present invention. In computer network 10, client system 20 is coupled through the Internet 40, or other communication network, e.g., over any local area network (LAN) or wide area network (WAN) connection, to any number of content server systems $50_1$ to $50_N$. As will be described herein, client system 20 is configured according to the present invention to communicate with any of server systems $50_1$ to $50_N$, e.g., to maintain one or more user accounts and restrict access to them using authentication based security protocols.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access and obtain authentication from server systems $50_1$ to $50_N$ over Internet 40.

Client system 20 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, login forms and other information provided by server systems $50_1$ to $50_N$ or other servers. The present invention is suitable for use with the Internet, which refers to a specific global network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are configurable and made operative using an application including computer code run using a central processing unit such as an Intel x86-compatible microprocessor, an AMD x86-compatible microprocessor, or the like or multiple microprocessors. Computer code for configuring and opening client system 20 to communicate, process and display data and media content as described herein is preferably downloaded and stored on a hard disk, but the entire program code, or portions thereof, may also be stored in any other volatile or non-volatile memory medium or device such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of content server systems $50_1$ to $50_N$ to client system 20 over the Internet, or transmitted over any other network connection (e.g., extranet, VPN, LAN, or other conventional networks) using any communication medium and protocol (e.g., TCP/IP, HTTP, HTTPS, Ethernet, or other conventional media and protocol).

It should be appreciated that computer code for implementing embodiments of the present invention can be C, C++, HTML, XML, Java, JavaScript, etc., or any suitable scripting language, e.g., VBScript, or any other suitable programming language that can be executed on client system 20 or compiled to execute on client system 20. In some embodiments, no code is downloaded to client system 20, and needed code is executed by a server, or code already present at client system 20 is executed.

B. Client System

Figure 2:
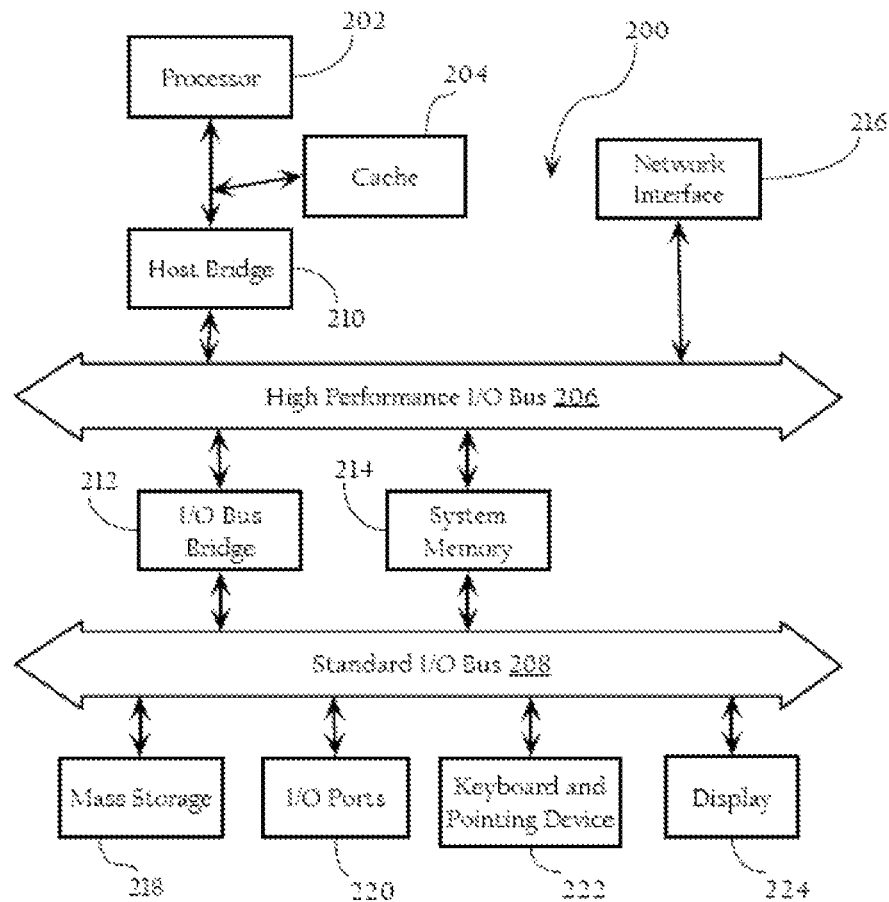
FIG. 2 is a diagram showing an example system architecture for a client system or a server, which might be used by an embodiment of the present invention.

FIG. 2 illustrates, for didactic purposes, a hardware system 200, which may be used to implement a client system or a server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In one embodiment, the login process described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Domain-Restrictive Data Storage Application

Figure 3:
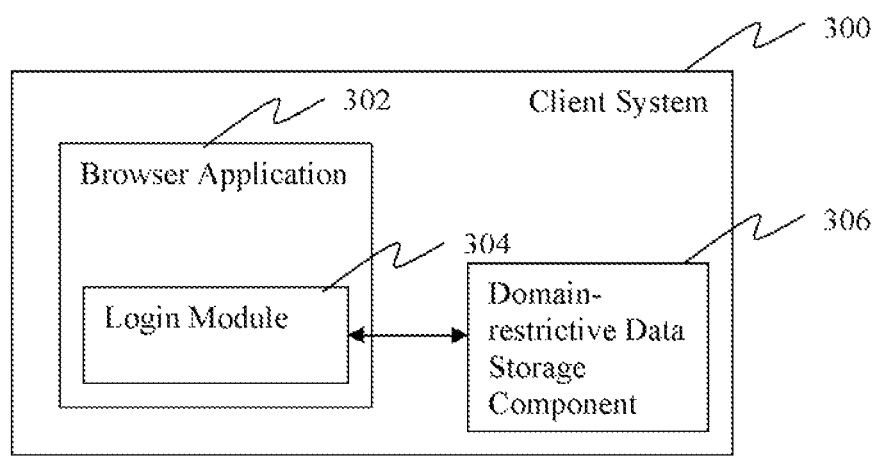
FIG. 3 is a diagram showing an example of a client system, a browser client application, a login module, and a domain-restrictive storage application.

FIG. 3 illustrates an example architecture of a client system 300, a browser client application 302, a login module 304, and a domain-restrictive data storage application 306, which architecture might be used by an embodiment of the present invention. In the embodiment, the browser client application 302 interacts with a server over a computer network and displays data received from the server within a user interface window on the display of the client system 300. The login module 304 is initialized and operated within the context of the execution environment of the browser application 302. In one embodiment, the login module 304 is embedded within an underlying HTML login page, for example, as a Javascript code module or as a Flash component. The domain-restrictive data storage application 306 is initialized by the browser client application 302 and maintains a local token data store of token and other authentication information. Access to the local token data store is restricted based on the domain context of the server. In one embodiment, the domain-restrictive storage application 306 is a Local Sandbox provided by the Flash Player from Adobe. In connection with the browser client application 302, the domain-restrictive storage application 306 obtains an indication of a current domain context, and determines whether to allow access to the local token data store to any requesting application, such as login module 304. In some embodiments, the login module 304 and the browser client application 302 communicate with the domain-restrictive storage application 306 via application programming interface calls.

In one embodiment, the login module 304 accesses the domain-restrictive data storage application 306 to retrieve one or more identifiers from the local token data store, and displays the retrieved identifiers in the user interface window of the browser application 302. Upon receiving a selection of one of the displayed identifiers, the domain-restrictive data storage application 306 retrieves a token corresponding to the selected identifier from the local token data store and generates a challenge response for the selected identifier using the retrieved token. The challenge response and the token are then sent to the network server to establish a login session. Since the identifiers are only stored on the client system 300 and only accessible through the domain-restrictive data storage application 306, a phisher has to find ways to get access to the identifiers in order to display a similar login page. However, since access to the local token data store is controlled by the server domain context, the phisher has to get access to the server domain. As a result, a phishing attack becomes much more difficult. In some embodiments, the identifiers stored in the local token data store might be text keywords, images, audio, and video. Therefore, when the one or more identifiers or avatars are displayed, they are easily recognizable and distinguishable. However, the lack of the identifier or avatar on the login page can signal a user of a possible phishing attack.

D. Login Process

Figure 4:
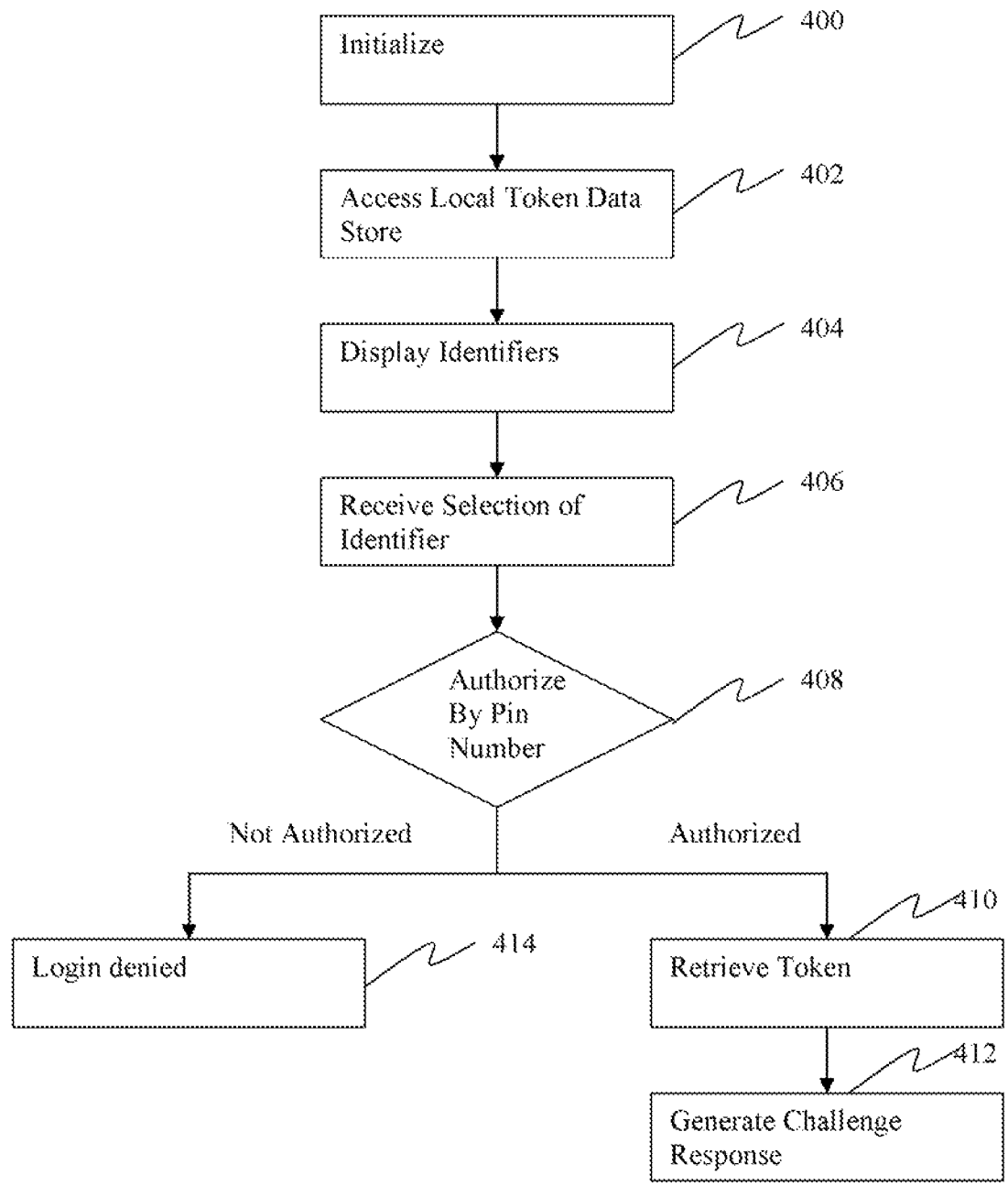
FIG. 4 is a diagram showing a flowchart of the example process used for accessing a local token data store and generating challenge responses.

FIG. 4 shows a flowchart of a login process, which process might be used by an embodiment of the present invention. The login process is implemented by the login module in a login page, and executed within the context of the browser application. In the first step 400, the embodiment initializes the browser client application, the login module, and the domain-restrictive data storage application. In step 402, the login module accesses the local token data store through the domain-restrictive data storage application and retrieves the identifiers. In step 404, the login module displays the retrieved identifiers. In some embodiments, the login module 304 may also retrieve and display other information associated with the identifiers, such as images (avatars, thumbnail photos, icons, etc.), audio, or video. In step 406, the login module receives a selection of one of the displayed identifiers. The selection comes from a user, typically through clicking on one of the displayed identifiers. In some embodiments, an optional personal identification number (PIN) or string may be associated with each displayed identifier and stored in the local token data store. The personal identification number or string is specific to a client system and is encrypted along with the user id to avoid accidental discovery. It is stored on the client system and is not sent to the server. If a personal identification number or string is present for an identifier, the embodiment further comprises an authentication step 408. In one embodiment, the login module 304 prompts the user for a password, such as a PIN. If the received personal identification number or string is authorized, the embodiment retrieves a token corresponding to the selected identifier from the local taken data store in step 410, and generates a challenge response for the selected identifier using the retrieved token in step 412. The challenge response and the token are then sent to the network server to establish a login session. If the received personal identification number or string is not authorized, the embodiment denies the login and terminates the process in step 414. Since the personal identification numbers or strings are stored in the local token data store and not sent to the server, a phisher has to get access to the local token data store which is restricted by server domains. Therefore, a phisher first has to get access to authorized server domains which increases the technical difficulty of phishing attacks. In one embodiment, if a user suspects that one or more identifiers have been compromised by phishing attacks, the user can login to the server and deactivate the accounts corresponding to the one or more of the compromised identifiers.

Figure 5:
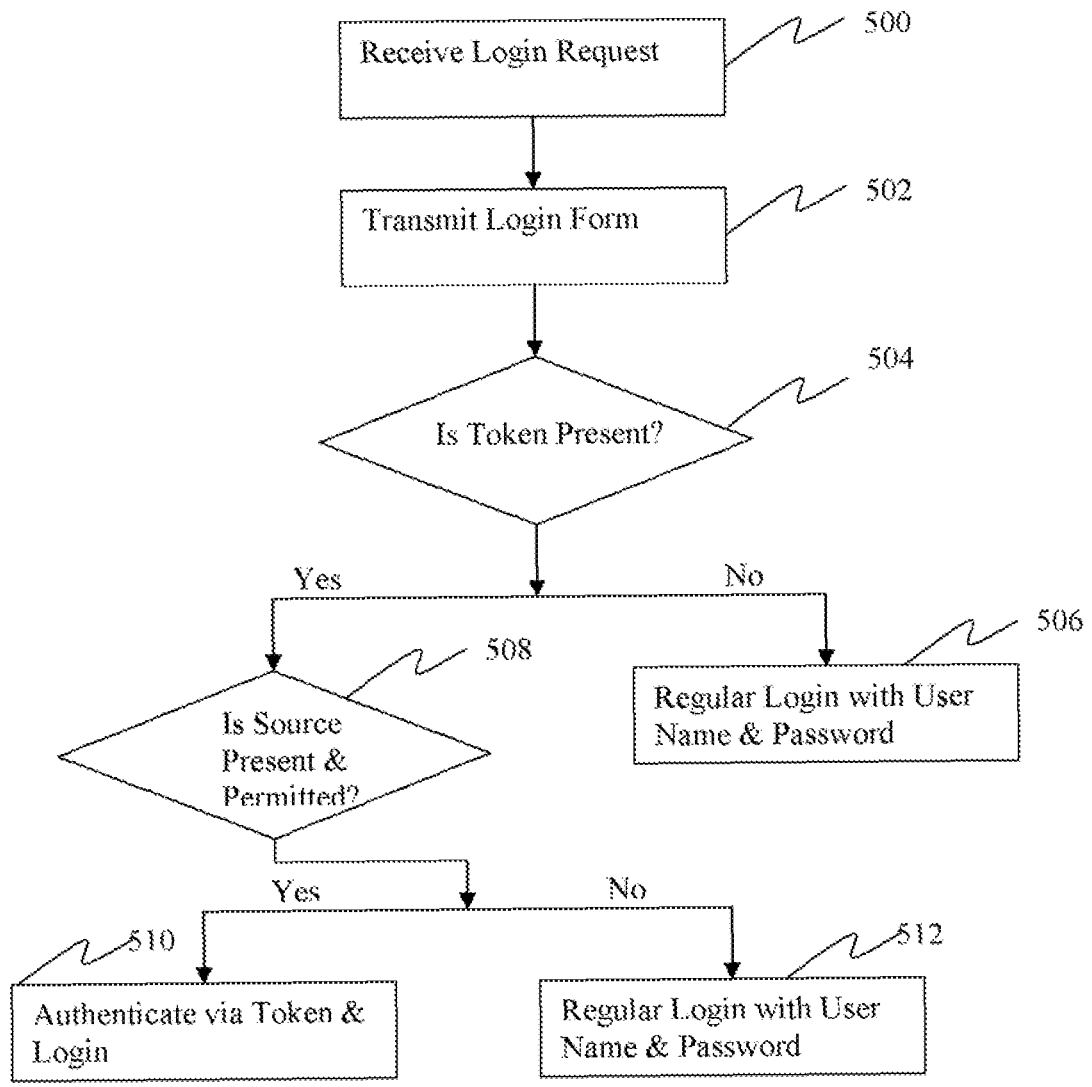
FIG. 5 is a diagram showing a flowchart of the login process on a server.

FIG. 5 shows a flowchart of a process on a network server for a login request, which process might be used by an embodiment of the present invention. In the process's first step 500, the embodiment receives a login request from a client system. In step 502, the embodiment transmits a login form to the client system. The embodiment then checks whether a token is present in the response from the client system for the login form in step 504. If there is no token in the response, the embodiment uses regular login with user name and password in step 506. In some embodiments, upon successful login in step 506, the network server generates a token for the given user name and password and sends it back to the client system. The client system subsequently stores the token in the local token data store. In some embodiments, an application source identifier might be associated with a token. The embodiment checks whether the application source identifier is permitted for the login process in step 508. If the application source identifier is permitted, the embodiment uses the token to establish a login session with the network server in step 510. In some embodiments, the network server generates a cookie and sends the cookie to the client system to maintain the login session. If the application source identifier is not permitted, the embodiment uses regular login with user name and password in step 512.

Figure 6:
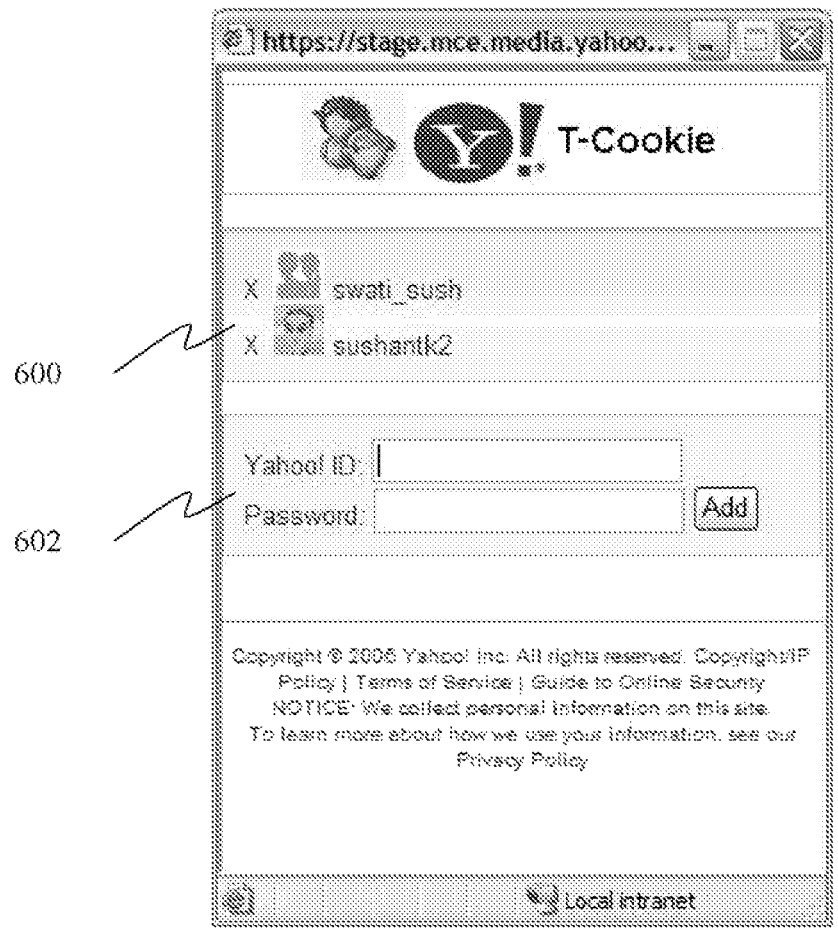
FIG. 6 is a screenshot of an example of a login screen on a client node.

FIG. 6 shows a screen shot of an example login screen of one embodiment of the present invention. A list of identifiers 600 is shown to a user. A user could add an identifier to the login module by entering a user id and a password in the login form 602. If the login is successful, the user id and the password will be entered in the local token data store by the login module.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

What is claimed is:

1. An apparatus, comprising:
a memory;
one or more processors;
a browser client application, stored in the memory, comprising instructions operable to cause the one or more processors to interact with a server over a computer network;
a domain-restrictive data storage application, stored in the memory, comprising instructions operable, in connection with the browser application, to cause the one or more processors to:
maintain, on a client system, a local token data store of token information; and
restrict access to the token information on a server domain basis, wherein the domain-restrictive data storage application employs sandbox security; and
a login module, stored in the memory, comprising instructions operable within the context of the execution environment of the browser application to cause the one or more processors to:
access the domain-restrictive data storage application to retrieve one or more identifiers from the local token data store;
display the retrieved identifiers in a user interface window of the browser application, wherein the apparatus is a client system.

2. The apparatus of claim 1, wherein the domain-restrictive data storage application further comprises instructions operable to obtain an indication of a current domain context.

3. The apparatus of claim 1, wherein the browser client application communicates with the domain-restrictive data storage application via one or more application programming interface calls.

4. The apparatus of claim 1, wherein the browser client application communicates with the login module via one or more application programming interface calls.

5. The apparatus of claim 1, wherein the login module further comprises an authentication module, stored in the memory, comprising instructions to cause the one or more processors to:
receive a personal identification number or string that is not sent to the server;
authenticate the received personal identification number or string; and
retrieve a token corresponding to the selected identifier from the local token data store.

6. The apparatus of claim 1, wherein the domain-restrictive data storage application is initialized and executed within the context of the browser client application.

7. The apparatus of claim 1, wherein the identifier comprises one or more text keywords, images, audio, or video.

8. A method, comprising the operations of:
accessing a local token data store implemented on a client computer system to retrieve one or more identifiers, wherein access to the local token data store is restricted through the use of sandbox security;
displaying the retrieved identifiers;
receiving a selection of one of the displayed identifiers;
retrieving a token corresponding to the selected identifier from the local token data store;
generating a challenge response for the selected identifier using the retrieved token, wherein each operation of the method is executed by one or more processors on the client computer system.

9. The method of claim 8, wherein the accessing operation comprises making one or more application programming interface calls to a domain-restrictive data storage application operable to:
obtain an indication of a current domain context;
maintain a local token data store of token information; and
restrict access to the local token data store based on the current domain context.

10. The method of claim 8, wherein the receiving operation further comprises receiving a personal identification number or string that is not sent to a server.

11. The method of claim 10, wherein the retrieving operation further comprises:
    authenticating the received personal identification number or string; and
    retrieving a token corresponding to the selected identifier from the local token data store.

12. The method of claim 9, wherein the domain-restrictive data storage application is initialized and executed within the context of a browser client application.

13. The method of claim 8, wherein the identifier comprises one or more user names, avatars, icons, audio files or video files.

14. Logic encoded in one or more tangible media, which are non-transitory, for execution on a client system, wherein the logic when executed is operable to:
    access a local token data store on the client system to retrieve one or more identifiers, wherein access to the local token data store is restricted through the use of sandbox security; display the retrieved identifiers; receive a selection of one of the displayed identifiers; retrieve a token corresponding to the selected identifier from the local token data store; generate a challenge response for the selected identifier using the retrieved token.

15. Logic, according to claim 14, wherein the logic when executed is further operable to make one or more application programming interface calls to a domain-restrictive data storage application operable to:
    obtain an indication of a current domain context;
    maintain a local token data store of token information; and
    restrict access to the local token data store based on the current domain context.

16. Logic, according to claim 14, wherein the logic when executed is further operable to receive a personal identification number or string that is not sent to a server.

17. Logic, according to claim 16, wherein the logic when executed is further operable to:
    authenticate the received personal identification number or string; and
    retrieve a token corresponding to the selected identifier from the local token data store.

18. Logic, according to claim 14, wherein the logic when executed is further operable to initialize and execute the domain-restrictive data storage application within the context of a browser client application.

19. Logic, according to claim 14, wherein the logic when executed is further operable to display the identifier as one or more user names, avatars, icons, audio files or video files.

20. A method, comprising the operations of:
    receive a login request over a network from a client system;
    transmit a login form to the client system;
    receive a response from the client system, wherein the response includes a token retrieved from a local token data store on the client system, wherein access to the local token data store is restricted through the use of sandbox security on the client system, and wherein the token is associated with an application source identifier;
    authenticate the client system if the application source identifier allows for a login without a user name and password, wherein each operation of the method is executed by a processor on a network server.

* * * * *